Nov. 9, 1965
R. H. SHAW ETAL
3,216,199
POWER CONVERSION SYSTEM
Filed May 15, 1962
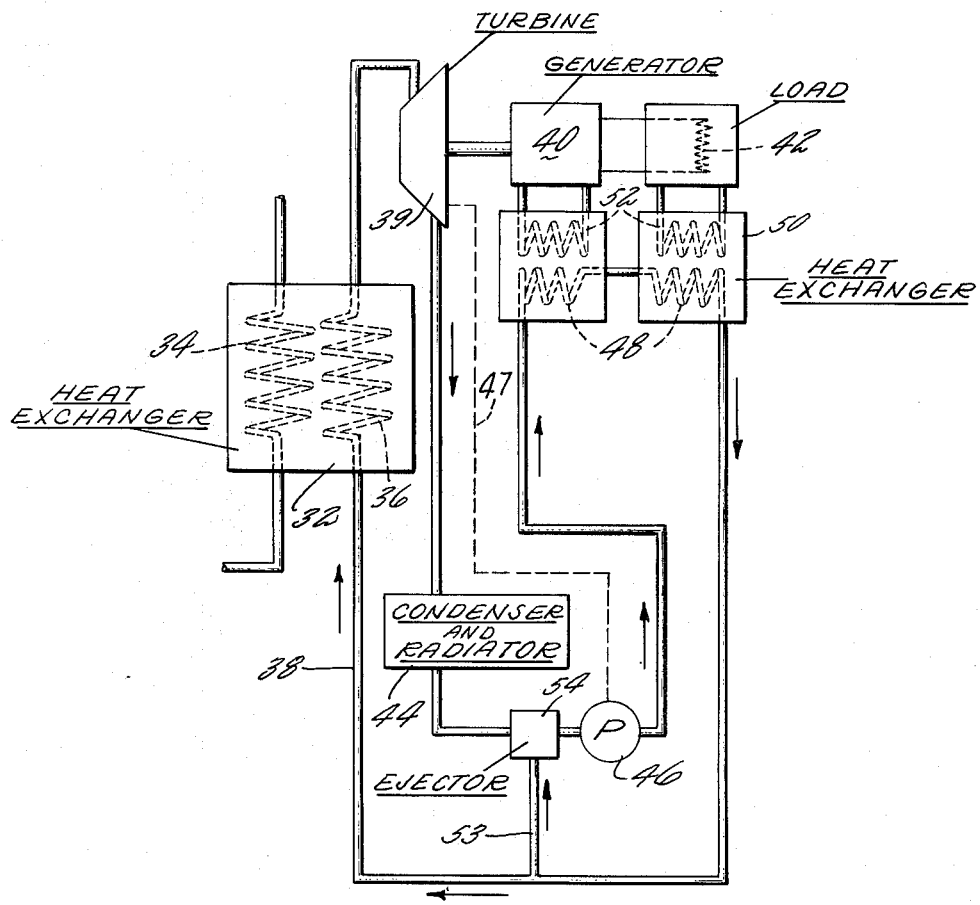
INVENTORS
ROBERT H. SHAW
RUSSELL A. THOMPSON
BY Charles A. Warren
ATTORNEY 3,216,199
POWER CONVERSION SYSTEM
Robert H. Shaw and Russell A. Thompson, East Hartford, Conn., assignors to United Aircraft Corporation, East Hartford, Conn., a corporation of Delaware
Filed May 15, 1962, Ser. No. 196,548
3 Claims. (Cl. 60—107)

This invention relates to a power conversion system particularly adapted to space installations.

One feature of the invention is a system for converting heat energy in space into usable electrical energy. Another feature is a system for retaining all of the heat possible within the system.

One feature is the use of an injector in the power conversion system to minimize the necessary controls and also to minimize the size of the radiator or condenser necessary for heat disposal in the conversion system. This injector also permits the circulating pump to operate directly from the turbine shaft without a speed reduction and without conversion in the pump.

Other features and advantages will be apparent from the specification and claims, and from the accompanying drawing which illustrates an embodiment of the invention.

The single figure is a diagrammatic showing of the power conversion system.

The invention relates to a power conversion system by which the heat is converted to electricity and is available continuously whether the solar energy absorber is in operation and is intended for use with a heat absorption and storage system described in copending application Serial No. 196,550, filed May 15, 1962, and having the same assignee as this application. The device will thus produce electricity continuously and in a solar unit will provide electricity whether or not the sun is visible.

The power conversion system includes heat exchanger 32 including an input coil 34 to which heat is supplied at a uniform rate as, for example, by the storage system of the above-identified application. A second coil 36 in the heat exchanger 32 is in a fluid circuit 38 and receives heat at a uniform rate. The fluid in the circuit 38 is selected so that heat from the coil 34 in the heat exchanger 32 will vaporize the liquid in the coil 36 and this vapor powers a turbine 39 also located in the circuit 38. The turbine drives a generator 40 which supplies electrical energy for a load represented by the coil 42.

From the turbine the vapor therein is delivered to a condenser and radiator 44 also in the circuit 38 where enough heat is removed from the fluid so that the vapor is condensed to a liquid.

Downstream of the condenser 44 is a pump 46 connected to and driven directly from the turbine 39, as represented by the dashed line 47.

This pump delivers the fluid in the circuit 38 through the coils 48 of a secondary heat exchanger 50 where the liquid is additionally heated by accepting heat from the heat exchanger coils 52 which may form parts of cooling fluid circuits which serve to maintain the generator 40 and the load 42 at suitable temperatures. From the heat exchanger 48 the greater part of the liquid continues through circuit 38 and back to the coil 36 in the heat exchanger 32. A bypass conduit 53 connects from the circuit 38 downstream of the heat exchanger 50 to an ejector 54 of convention construction at the inlet of the pump 46. The ejector may be similar to that shown on pages 8-60 in the book entitled "Handbook of Engineering Fundamentals," 2nd edition, by Esbach, published by John Wiley and Sons. This ejector uses a portion of the flow downstream of the heat exchanger 48 as its primary stream and adjusts the condensed fluid from the condenser and radiator 44 to the desired pump inlet pressure. The effect of this ejector is to permit the pump to run at turbine speed without cavitation and also permits the use of a large secondary cooling flow, that is the flow in the circuit 53 to reduce the cooling requirements of the condenser and radiator thereby making it possible for this device to be more compact. By maintaining a constant heat input in the heat exchanger 32, it is possible to have the turbine operate under design conditions with no functioning turbine controls.

It is to be understood that the invention is not limited to the specific embodiment herein illustrated and described, but may be used in other ways without departure from its spirit as defined by the following claims.

We claim:

1. In a power conversion system, a source of heat, a fluid circuit including the heat source in which the fluid is vaporized, a turbine in the circuit driven by the vapored fluid, a generator driven by the turbine, a condenser in the fluid circuit downstream of the turbine, a pump in the fluid circuit for returning the fluid from the condenser to the source of heat, a secondary fluid heating means in the circuit downstream of the pump and between the pump and the heat source and a bypass connection from the circuit upstream of the heat source to the circuit immediately upstream of the pump inlet, thereby to bypass a part of the fluid around the source of heat, the turbine and the condenser.

2. A conversion system as in claim 1 in which an ejector is provided where the bypass connection joins the circuit upstream of the pump inlet such that the fluid pressure from the condenser is raised to pump inlet pressure by the ejector.

3. A power conversion system including a source of heat, a closed fluid circuit including said source, a turbine in the circuit downstream of the source, the fluid in the circuit being such as to be vaporized in said heat source for powering the turbine, an electrical device driven by the turbine, a condenser in the fluid circuit downstream of the turbine for condensing the vaporized fluid to a liquid, a pump in the circuit between the condenser and the heat source, a secondary fluid heating means between the pump and the heat source and a bypass connection from the circuit immediately upstream of the heat source to the circuit immediately upstream of the pump inlet for delivery of heated fluid from said secondary source directly to said pump inlet, thereby bypassing a part of the fluid flow around the source of heat, the turbine and the condenser.

References Cited by the Examiner
UNITED STATES PATENTS

| 3,024,366 | 3/62 | Yanagimachi | 290—2 |
| 3,061,733 | 10/62 | Humpal | 290—2 |
| 3,070,703 | 12/62 | Podolny | 290—2 |

FOREIGN PATENTS

| 344,331 | 3/31 | Great Britain. |
| 721,099 | 12/54 | Great Britain. |

SAMUEL LEVINE, Primary Examiner.

MAYNARD R. WILBUR, Examiner.